(12) United States Patent
Kim et al.

(10) Patent No.: US 8,509,310 B2
(45) Date of Patent: Aug. 13, 2013

(54) METHOD, MEDIUM, AND SYSTEM ENCODING AND/OR DECODING AN IMAGE

(75) Inventors: Woo-shik Kim, Yongin-si (KR); Hyun-mun Kim, Seongnam-si (KR); Dae-sung Cho, Seoul (KR); Dmitri Birinov, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1486 days.

(21) Appl. No.: 11/727,835

(22) Filed: Mar. 28, 2007

(65) Prior Publication Data
US 2007/0230585 A1    Oct. 4, 2007

Related U.S. Application Data

(60) Provisional application No. 60/786,380, filed on Mar. 28, 2006.

(30) Foreign Application Priority Data

Jun. 1, 2006  (KR) .......................... 10-2006-0049152
Mar. 28, 2007  (KR) .......................... 10-2007-0030196

(51) Int. Cl.
*H04N 7/12* (2006.01)
(52) U.S. Cl.
USPC .................................................... 375/240.26
(58) Field of Classification Search
None
See application file for complete search history.

(56) References Cited

U.S. PATENT DOCUMENTS

| | | | |
|---|---|---|---|
| 4,833,543 A * | 5/1989 | Verbiest ........................ | 358/425 |
| 6,067,383 A | 5/2000 | Taniguchi et al. | |
| 6,587,588 B1 * | 7/2003 | Bottou et al. ................. | 382/240 |
| 2001/0021227 A1 * | 9/2001 | Ngai ......................... | 375/240.28 |
| 2002/0093698 A1 * | 7/2002 | Kagawa ....................... | 358/518 |
| 2002/0126130 A1 * | 9/2002 | Yourlo ........................ | 345/582 |
| 2003/0035476 A1 * | 2/2003 | Ohyama et al. ............. | 375/240.1 |

(Continued)

FOREIGN PATENT DOCUMENTS

| | | |
|---|---|---|
| EP | 1 617 679 A2 | 1/2006 |
| JP | 07-023397 | 1/1995 |

(Continued)

OTHER PUBLICATIONS

Chinese Office Action issued Mar. 22, 2010 corresponds to Chinese Patent Application 200780011082.8.

(Continued)

*Primary Examiner* — Gilberto Barron, Jr.
*Assistant Examiner* — David Le
(74) *Attorney, Agent, or Firm* — Staas & Halsey LLP (57) ABSTRACT

An encoding method, medium, and system encoding an image, with an image being encoded by generating a plurality of image slices as images of each color component of the image and encoding the image slices in parallel with each other and independently of each other. Accordingly, although an image to be encoded has a large number of color components, the image can be compressed promptly. In addition, a decoding method, medium, and system are also provided decoding an image, with a plurality of encoded image slices being included in a corresponding bitstream, which are images of each color component of the image to be restored, are decoded in parallel with each other and independently of each other so as to restore the image using the decoded image slices. Accordingly, although an image to be decoded has a large number of color components, the image can be restored promptly.

18 Claims, 8 Drawing Sheets

(56) References Cited

U.S. PATENT DOCUMENTS

| | | | |
|---|---|---|---|
| 2004/0005002 A1* | 1/2004 | Saw | 375/240.01 |
| 2005/0060421 A1* | 3/2005 | Musunuri et al. | 709/231 |
| 2008/0123736 A1 | 5/2008 | Sekiguchi et al. | |

FOREIGN PATENT DOCUMENTS

| | | |
|---|---|---|
| JP | 10-164584 | 6/1998 |
| KR | 10-1018504 | 2/2011 |
| WO | WO 99/37097 | 7/1999 |
| WO | 2007/034601 A1 | 3/2007 |

OTHER PUBLICATIONS

Chinese Office Action dated Nov. 16, 2011 issued in corresponding Chinese Patent Application No. 200780011082.8.

Japanese Non Final Rejection Office Action issued Apr. 26, 2011 corresponds to Japanese Patent Application No. 2009-502675.

European Search Report corresponding to Application No. 07745678.8-1247/1999965, dated Aug. 31, 2012.

"Intra-only 4:4:4 Profile for H.264/AVC FRExt," Wedi, T., et al., JVT Meeting, Oct. 13, 2005, pp. 1-22.

"SEI Message for Independent Color Component Coding," Woo-Shik Kim, et al., Mar. 31, 2006, pp. 1-6.

"Discussion on the Parallel Implementation of 4:4:4 Coding in H.264/MEG-Part10," Haoping Yu et al., Jan. 10, 2006, pp. 1-10.

"Video compression with parallel processing," Ahmad Ishfaq, et al., Parallel Computing, vol. 28, No. 7-8, Aug. 1, 2002, pp. 1039-1078.

"YUV Formats," Anonymous, Feb. 6, 2006, retrieved from http://web.archive.org/web/20060206093329/http://www.fourcc.org/yuv.php. on Jun. 14, 2012.

"An Efficient Architecture for Color Space Conversion Using Distributed Arithmetic," Bensaali, F., et al., School of Computer Science, Queen's University of Belfast, May 23, 2004, ISBN: 978-0-7803-8251-0, pp. 265-268.

Japanese Office Action for Japanese Patent Application No. 2009-502675; mailed Aug. 28, 2012.

Korean Office Action issued Apr. 29, 2013 in corresponding Korean Application No. 10-2007-0030196.

Chinese Office Action issued Mar. 5, 2013 in corresponding Chinese Patent Application No. 200780011082.8.

\* cited by examiner

| independent_chroma_coding (payloadSize) { | C | Descriptor |
|---|---|---|
| monochrome_type | 5 | ue(v) |
| } | | |

METHOD, MEDIUM, AND SYSTEM ENCODING AND/OR DECODING AN IMAGE

CROSS-REFERENCE TO RELATED APPLICATIONS

This application claims the benefit of U.S. Provisional Application No. 60/786,380, filed on Mar. 28, 2006, in the U.S. Patent and Trademark Office, and Korean Patent Application Nos. 10-2006-0049152, filed on Jun. 1, 2006 and 10-2007-0030196, filed on 28 Mar., 2007 in the Korean Intellectual Property Office, the disclosure of which is incorporated herein in its entirety by reference.

BACKGROUND OF THE INVENTION

1. Field of the Invention

One or more embodiments of the present invention relate to image encoding and/or image decoding, and more particularly, to a method, medium, and system encoding and/or decoding an image having a plurality of color components.

2. Description of the Related Art

An image may have a plurality of color components. For example, the image may have a luminance (Y) component, a blue chrominance (Cb) component, and a red chrominance (Cr) component, or have a red (R) component, a green (G) component, and a blue (B) component.

When an image having a plurality of color components is encoded, the conventional image encoding technique includes sequentially encoding each color component. For example, the conventional image encoder may encode the image by encoding a Y component, then encoding a Cb component, and then encoding a Cr component. Accordingly, the conventional image encoder cannot compress an image promptly if the image has a large number of color components. Herein, references to such separate component encodings will also reference image terms, such as a 4:0:0 image, or a 4:4:4: image. These terms can refer to the amount of available data for each component, e.g., a 4:4:4 image may have an equal amount of data for each component. For example, using the 4:4:4 image again, in an YCbCr color space the amount of sampling performed for the Luminance component may be same as the sampling performed for the two chrominance components. If there was no sampling in both of the chrominance components, then such an image in the YCbCr color space may be considered a 4:0:0 image, for example.

Thus, when decoding a bitstream generated by encoding an image having such a plurality of color components, the conventional image decoding includes sequentially decoding each color component. For example, the conventional image decoder may decode the image by decoding a Y component, then decoding a Cb component, and then decoding a Cr component. In addition, as noted above, with such multiple components, an additional aspect that may need to be considered is differing sampling quantities between the different component, requiring in additional decoding consideration. Accordingly, such a conventional image decoding technique cannot restore an image promptly if the image has a large number of color components.

SUMMARY OF THE INVENTION

One or more embodiments of the present invention provide a method, medium, and system for promptly encoding and/or decoding an image having a large number of color components.

Additional aspects and/or advantages of the invention will be set forth in part in the description which follows and, in part, will be apparent from the description, or may be learned by practice of the invention.

To achieve at least the above and/or other aspects and advantages, embodiments of the present invention include a method of encoding image data, including generating a plurality of image slices of the image data which are separate images of different color components of the image data, and independently encoding each of the plurality of image slices, with the independent encoding being irrespective of encoding between each image slice.

To achieve at least the above and/or other aspects and advantages, embodiments of the present invention include a system for encoding image data, including an image reorganization unit to generate a plurality of image slices of the image data which are separate images of different color components of the image data, and an encoding unit to independently encode each of the plurality of image slices, with the independent encoding being irrespective of encoding between each image slice.

To achieve at least the above and/or other aspects and advantages, embodiments of the present invention include a method of decoding image data from a bitstream, including independently decoding each of a plurality of encoded image slices included in the bitstream, with the encoded slices being separate images of different color components of the image data, and with the independent decoding being irrespective of encoding between each image slice, and restoring the image data using the decoded image slices.

To achieve at least the above and/or other aspects and advantages, embodiments of the present invention include a system decoding image data from a bitstream, including a decoding unit to decode each of a plurality of encoded image slices included in the bitstream, with the encoded slices being separate images of different color components of the image data, and with the independent decoding being irrespective of encoding between each image slice, and an image restoration unit to restore the image using the decoded image slices.

To achieve at least the above and/or other aspects and advantages, embodiments of the present invention include at least one medium including computer readable code to control at least one processing element to implement one or more embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 1A:
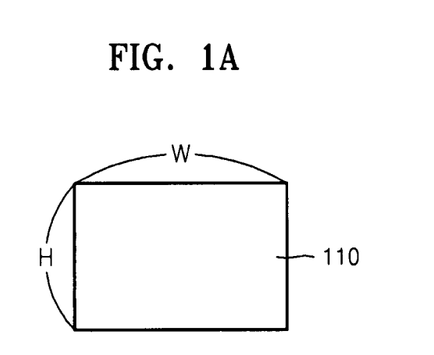
FIGS. 1A through 1C respectively illustrate slices of an image, spatial portions of an image, and a plurality of temporally different image slices, according to an embodiment of the present invention.
Figure 1B:
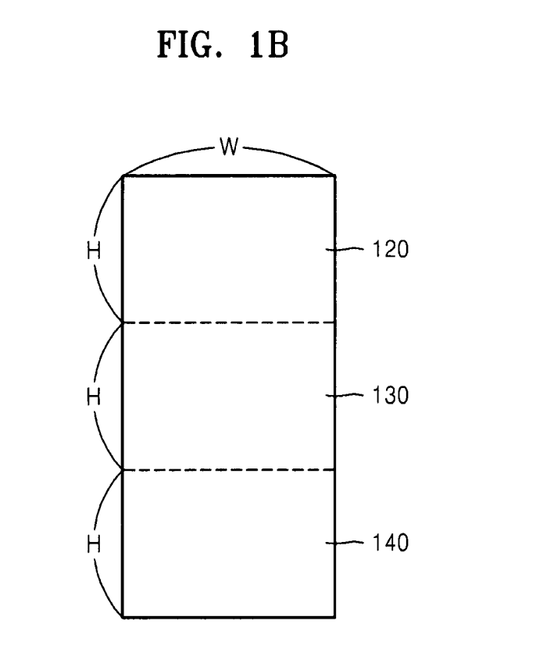
Figure 1C:
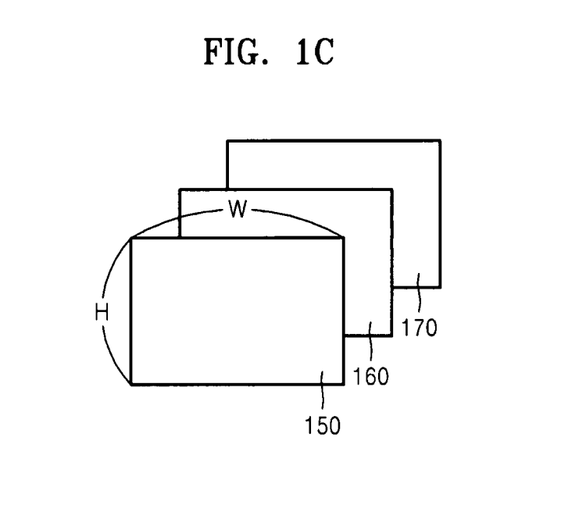

FIGS. 1A through 1C respectively illustrated slices of an image, spatial portions of an image, and a plurality of temporally different image slices, according to an embodiment of the present invention.

Specifically, FIG. 1A illustrates an example of a slice as an image 110 to be encoded (or to be decoded), according to an embodiment of the present invention. Referring to FIG. 1A, the image 110 to be encoded includes W pixels horizontally and H pixels vertically, where W and H are natural numbers.

In the description of the present invention, the image 110 to be encoded can be considered an image having a plurality of color components. Here, the color components may be a luminance (Y) component, a blue chrominance (Cb) component, and a red chrominance (Cr) component, for example, in which one color component such as the Cb component, or the Cr component is dependent on another color component such as the Y component, or may be a red (R) component, a green (G) component, and a blue (B) component, which are independent of each other, for example. In addition, the referenced image may only be a portion of an entire screen image. Further, the image 110 to be encoded may be an image at a point of time, for example, an respective image at time=t0.

Meanwhile, FIG. 1B illustrates a plurality of image slices 120, 130, and 140 of the image 110 to be encoded (or to be decoded), according to an embodiment of the present invention. FIG. 1C further illustrates a plurality of temporally different image slices 150, 160, and 170 of the image 110 to be encoded (or to be decoded), according to another embodiment of the present invention.

Throughout embodiments of the present specification, an image slice represents one color component of a respective image, portion of the image, or temporally different portion of the image.

In a method, medium, and system encoding an image according to an embodiment of the present invention, a plurality of image slices which are images of each color component of the image to be encoded are generated and then the image slices are separately encoded so as to encode the image. Here, the generated image slices may be images of independent color components such as the R, G, and B components, where each color is not dependent on another color. Thus, such a method, medium and system for encoding an image may encode each of the image slices independently. Encoding each of the image slices independently means that one image slice is encoded irrespective of the encoding of another image slice.

The same principle can be applied to a method, medium, and system decoding an image according to an embodiment of the present invention. A plurality of encoded image slices included in a bitstream, which are respective color component slices of the image to be restored, are decoded in parallel with each other, for example, and independently of each other so as to restore the image using the decoded image slices. Here, the image slices may be images of independent color components such as the R, G, and B components. Thus, such a method, medium, and system decoding an image may decode each of the image slices independently. Decoding each of the image slices independently means that one image slice is decoded irrespective of a decoding of another image slice.

Referring to FIG. 1B, each of the image slices 120, 130, and 140 may be spatially divided from each other. The image slices 120, 130, and 140 may together form an image including W pixels horizontally and 3H pixels vertically. Here, the image formed by the image slices 120, 130, and 140 can also be an image at a particular point in time, for example, at time=t0. In the image formed by the image slices 120, 130, and 140, as described above, a value of each pixel of the image may be represented by one color component. Thus, as noted above, the image can be regarded to be a 4:0:0 image. For example, typically a reference to a 4:0:0 image may have only a luminance component, while such a 4:0:0 image representation can also be used for representing just an image with only a single RGB component, e.g., an image with only an R component, B component, or a G component when such a image representation system is applied to RGB information compared to a typical YCbCr image representation, where a 4:0:0 would represent an image with only luminance information.

On the other hand, referring to FIG. 1C, each of the image slices 150, 160, and 170 may be temporally divided from each other. In addition, for example, each of the image slices 150, 160, and 170 may form an image including W pixels horizontally and H pixels vertically. Here, images formed by the image slices 150, 160, and 170 are at least images at three points of time, for example, time=t0, t0+T/3, t0+2T/3, where T is a natural number. In the images formed by the image slices 150, 160, and 170 as described above, a value of each pixel of the images may be represented by one color component. Thus, as noted above the images can be regarded as a 4:0:0 image, at least in the RBG color space.

Figure 2:
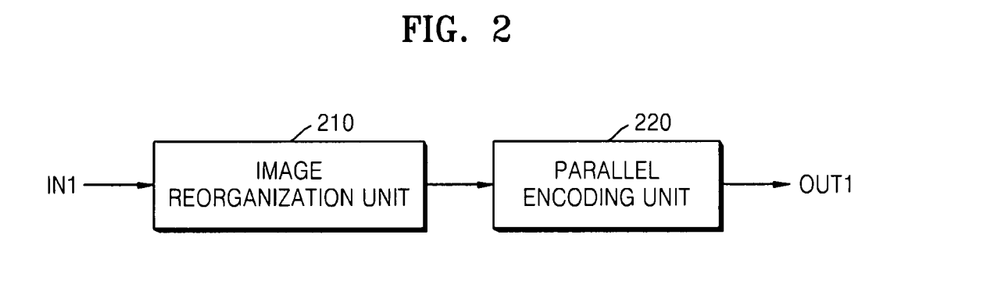
FIG. 2 illustrates an image encoder, according to an embodiment of the present invention.

FIG. 2 illustrates an image encoder, according to an embodiment of the present invention.

Referring to FIG. 2, the image encoder may include an image reorganization unit 210 and a parallel encoding unit 220, for example.

The image reorganization unit 210 may generate a plurality of image slices of an image to be encoded, which may be input through an input terminal IN1, for example. Specifically, the image reorganization unit 210 may generate a plurality of image slices as in FIG. 1B, for example, which may form an image from the image to be encoded, according to an embodiment of the present invention. Alternatively, the image reorganization unit 210 may generate a plurality of image slices as in FIG. 1C, for example, which may respectively form a plurality of temporally different images from image data, e.g., a series of images, to be encoded, according to an embodiment of the present invention.

Meanwhile, if the image input through the input terminal IN1, for example, includes a Y component, a Cb component, and a Cr component in which one color component such as the Cb component, or the Cr component is dependent on another color component such as the Y component, for example, the image reorganization unit 210 may convert the input image into an image including R, G, and B components which are independent of each other and then generate the described image slices.

The parallel encoding unit 220 may encode the image slices in parallel with each other and independently of each other so as to generate a bitstream, for example, and output such a bitstream through the illustrated output terminal OUT1.

Meanwhile, in an embodiment, when the image slices of FIG. 1B are encoded, the parallel encoding unit 220 may not apply a deblocking filter at the boundary between the adjacent image slices. Here, the deblocking filter is a filter adopted by H.264/Advanced Video Coding (AVC) standards, that is, a filter for removing block distortion.

In addition, the image encoder, according to an embodiment may also generate the bitstream including monochrome type information as well as the encoded image slices.

For example, when the image to be encoded has a plurality of color components and the image is encoded by encoding a plurality of image slices of the image, the image encoder according to such an embodiment may generate the above mentioned bitstream including the monochrome type information as well as the encoded image slices. In this case, the monochrome type information may indicate whether the image encoded into the bitstream is a plurality of image slices such as an image slice corresponding to the R component, an image slice corresponding to the G component, and an image slice corresponding to the B component and whether they are spatially and/or temporally divided from each other.

Otherwise, regardless of the type of image and the encoding type of the image, an image encoder according to an embodiment may also generate the above mentioned bitstream including the monochrome type information as well as the encoded image slices. In this case, the monochrome type information may indicate whether the image encoded into the bitstream is a 4:0:0 image, a 4:2:0 image, a 4:2:2 image, or a 4:4:4 image, for example, or is a plurality of image slices such as an image of the R component, an image of the G component, and an image of B component, having a plurality of independent color components that are spatially and/or temporally divided from each other, according to an embodiment of the present invention. Consequently, if an image to be encoded is a 4:4:4 image and the image encoder according to the current embodiment encodes the image by using a conventional technique (i.e., without generating a plurality of image slices which can be regarded as 4:0:0 images using a 4:4:4 image and encoding the 4:4:4 image by encoding the image slices) of encoding the 4:4:4 image by encoding the luminance component, then encoding a blue chrominance component, and then encoding a red chrominance component, the image encoder according to an embodiment may generate a bitstream including the encoded 4:4:4 image and monochrome type information which indicates that the image encoded into the bitstream is a 4:4:4 image, i.e., indicating that such an encoding does not include such encoding of the present application but indicating that such an encoding was performed by a conventional technique.

Figure 3:
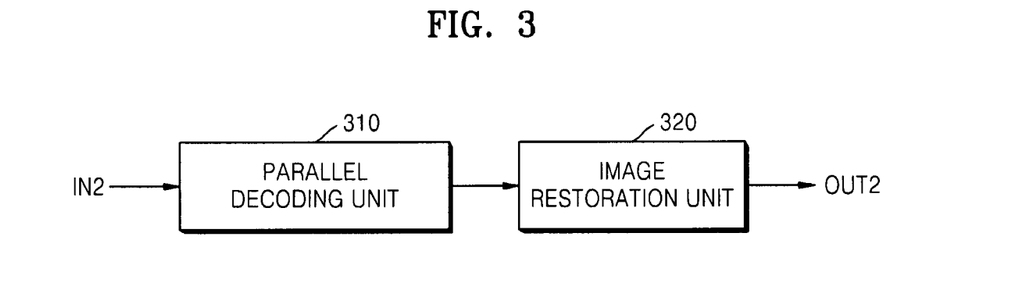
FIG. 3 illustrates an image decoder, according to an embodiment of the present invention.

FIG. 3 illustrates an image decoder, according to an embodiment of the present invention.

Referring to FIG. 3, the image decoder may include a parallel decoding unit 310 and an image restoration unit 320, for example.

The parallel decoding unit 310 may decode a plurality of encoded image slices included in a bitstream, e.g., as input through an input terminal IN2, in parallel with each other and independently of each other. Here, the bitstream input through the input terminal IN2 may have been encoded the same as the bitstream output through the output terminal OUT1 of FIG. 2.

If the encoded image slices are similar to the image slices illustrated in FIG. 1B, the parallel decoding unit 310 can complete decoding of the image slices at the same time.

Meanwhile, if the encoded image slices similar to the image slices illustrated in FIG. 1C, the parallel decoding unit 310 can complete decoding of each of the image slices sequentially, according to one embodiment of the invention.

The image restoration unit 320 may restore the image, e.g., as input through the input terminal IN2, using the image slices decoded by the parallel decoding unit 310, and may further output the restored image through the output terminal OUT2, for example. Specifically, the image restoration unit 320 may, thus, restore the image in consideration of values of corresponding pixels between the decoded image slices.

The image restoration unit 320 may, thus, restore an image having a plurality of independent color components such as R, G, and B components using a plurality of decoded image slices, then convert the restored image into an image having Y, Cb, and Cr components, where one color component such as the Cb component or the Cr component is dependent on another color component such as the Y component, for example, in a YCbCr color space 4:4:4 image, and then output the converted image through the output terminal OUT2.

In addition, an image decoder according to an embodiment may analyze monochrome type information included in the bitstream and operate when the monochrome type information of the bitstream indicates that an image encoded into the bitstream is an image of which a plurality of image slices having a plurality of independent color components have been spatially divided from each other or that an image encoded into the bitstream is an image of which a plurality of image slices having a plurality of independent color components have been temporally divided from each other, according to embodiments of the present invention.

Figure 4:
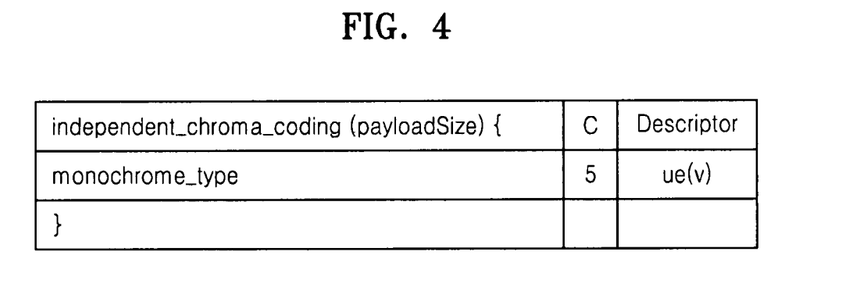
FIG. 4 illustrates a portion of bitstream syntax, according to an embodiment of the present invention.

FIG. 4 illustrates a portion of bitstream syntax, according to an embodiment of the present invention.

Referring to FIG. 4, and as indicated above, the bitstream according to an embodiment of the present invention may also include monochrome type information.

According to an embodiment, if the identified 'monochrome_type' in FIG. 4 is "0", an image encoded into the bitstream may be an image of which a plurality of image slices such as an image of the R component, an image of the G component, and an image of B component, having a plurality of independent color components such as R, G, and B components, that are spatially divided from each other.

Similarly, according to an embodiment, if the identified 'monochrome_type' in FIG. 4 is "1", an image encoded into the bitstream may be an image of which a plurality of image slices having a plurality of independent color components that are temporally divided from each other.

Figure 5:
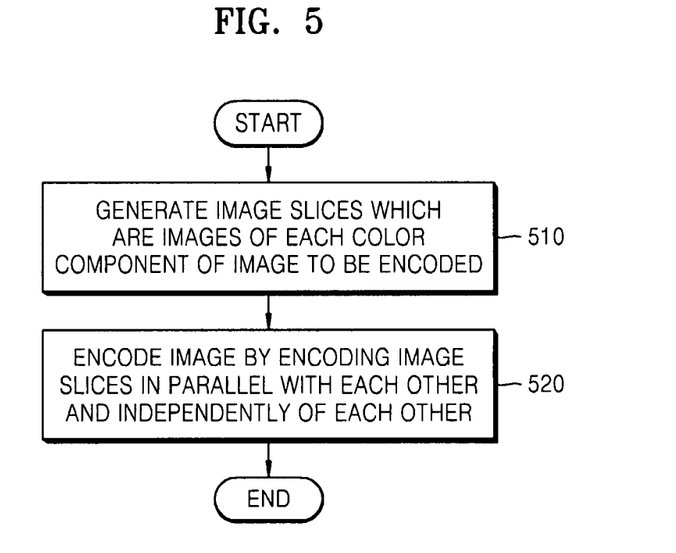
FIG. 5 illustrates a method of encoding an image, according to an embodiment of the present invention.

FIG. 5 illustrates a method of encoding an image, according to an embodiment of the present invention. The method may include a plurality of operations 510 and 520 of promptly compressing an image having a large number of color components. The flowchart illustrated in FIG. 5 will be described in conjunction with FIG. 2, noting that alternative method and system embodiments are equally available.

In operation 510, a plurality of image slices, which are images of each color component of an image to be encoded, may be generated, e.g., by the image reorganization unit 210. Here, the image slices may be spatially and/or temporally divided from each other, for example.

In operation 520, the image slices, such as those generated in operation 510, may be decoded in parallel with each other and independently of each other so as to generate a bitstream, e.g., by the parallel encoding unit 220.

Here, the bitstream may be further generated to include monochrome type information as well as the encoded image slices, e.g., by the parallel encoding unit 220.

Figure 6:
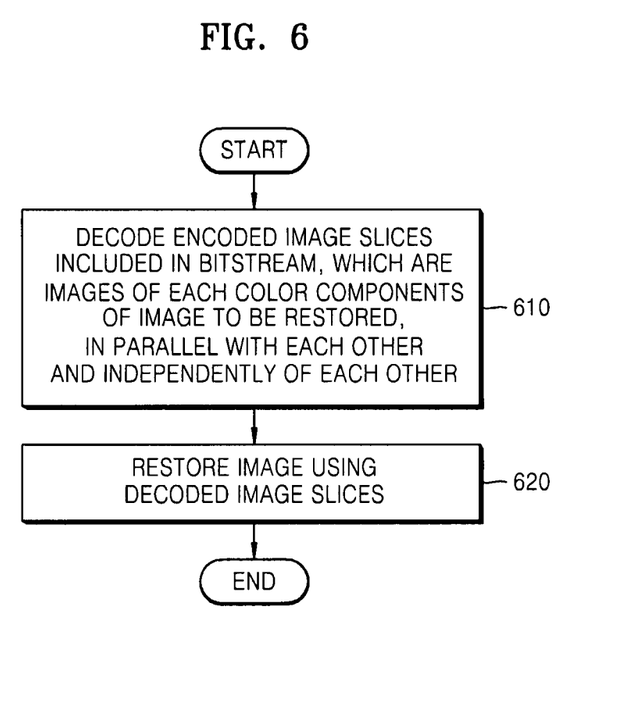
FIG. 6 illustrates a method of decoding an image, according to an embodiment of the present invention.

FIG. 6 illustrates a method of decoding an image, according to an embodiment of the present invention. The method may include a plurality of operations 610 and 620 of promptly restoring the image having a large number of color components, for example. Similar to above, the flowchart of FIG. 6 will be described in conjunction with FIG. 3, noting that alternative method and system embodiments are equally available.

In operation 610, a plurality of encoded image slices included in a bitstream, which are images of each color component of an image to be restored in parallel with each other and independently of each other, may be decoded, e.g., by the parallel decoding unit 310. If the encoded image slices are similar the image slices of FIG. 1B, the decoding of the image slices may be completed at the same time, for example. If the encoded image slices are similar to the image slices of FIG. 1C, the decoding of each of the image slices may be completed sequentially, also as an example.

In operation 620, the image may be restored in consideration of values of corresponding pixels between the image slices decoded in operation 610, e.g., by the image restoration unit 320.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, in an embodiment, in a method, medium, and system for encoding an image, the image may be encoded by generating a plurality of image slices which are images of each color component of the image and encoding the image slices in parallel with each other and independently of each other. Accordingly, although an image to be encoded has a large number of color components, the image can be compressed promptly.

Likewise, in an embodiment, in a method, medium, and system for decoding an image, a plurality of encoded image slices included in a bitstream, which are images of each color component of the image to be restored, may be decoded in parallel with each other and independently of each other so as to restore the image using the decoded image slices. Accordingly, although an image to be decoded has a large number of color components, the image can be restored promptly.

Thus, according to an embodiment, a method, medium, and system encoding an image may not encode an image of a YCbCr color space (hereinafter, referred to as a 4:4:4 image for the convenience of explanation) by encoding a Y component, and then encoding Cb and Cr components in accordance with the encoding mode of the Y component, but may encode the 4:4:4 image by converting the image into an image of an RGB color space, generating a plurality of images of each color component of the image of the RGB color space, such as an image of an R component, an image of a G component, and an image of a B component, and encoding each of the images of each color component independently regarding the images of each color component as a plurality of 4:0:0 images. Likewise, according to an embodiment, the method, medium, and system decoding an image may not decode a bitstream having encoded resultants of a 4:4:4 image by decoding a Y component, and then decoding Cb and Cr components in accordance with the decoding mode of the Y component, but by decoding each of a plurality of images of independent color components, such as an image of an R component, an image of a G component, and an image of a B component, independently regarding the images of each color component, e.g., considering each of the slices as a 4:0:0 image. By treating each slice as a 4:0:0 image, decoding of each slice in a similar manner as a typical 4:0:0 image is decoded can be accomplished. For example, decoding three 4:0:0 slice images for a single component may be easier than singularly decoding a 4:4:4 image with multiple color components.

Accordingly, a method, medium, and system encoding and/or decoding an image, according to an embodiment of the present invention, may comply with the H.264/AVC standards for encoding and decoding a 4:0:0 image, a 4:2:0 image, a 4:2:2 image, and a 4:4:4 image, except that the bitstream may include monochrome type information which indicates whether an included 4:4:4 image has been encoded by generating a plurality of images which can be regarded as a plurality of 4:0:0 images using the 4:4:4 image. Accordingly, depending on the result of the review of the monochrome type information, embodiments of the present invention can selectively perform encoding and/or decoding based upon the above separate slice technique of the conventional techniques for encoding and decoding an image while promptly compressing and restoring a 4:4:4 image, for example.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of encoding image data, comprising:
generating a plurality of image slices for each of three color components of 4:4:4 chroma format;
separately encoding the three color components based on an encoding type information, each of the three color components including plurality of image slices; and
generating a bitstream including the separately encoded three color components and the encoding type information,
wherein each of the plurality of image slices contains one of the three color components.

2. The method of claim 1, wherein the separate encoding of the three color components further comprises independently encoding each of the plurality of image slices in parallel.

3. The method of claim 1, wherein each of the image slices are generated by dividing the image data spatially and/or temporally.

4. The method of claim 1, further comprising converting the image data, as a YCbCr color space, into an RGB color space before performing the generating of the plurality of image slices.

5. At least one non-transitory medium comprising computer readable code to control at least one processing element to implement the method of claim 1.

6. A system for encoding image data, comprising:
an image reorganization unit to generate a plurality of image slices for each of three color components of 4:4:4 chroma format; and
an encoding unit, implemented by at least one processing device, to separately encoding the three color components based on an encoding type information, each of the three color components including the plurality of image slices and to generate a bitstream including the separately encoded three color components and the encoding type information,
wherein each of the plurality of image slices contains one of the three color components.

7. The system of claim 6, wherein the encoding unit independently encodes each of the plurality of image slices in parallel.

8. The system of claim 6, wherein each of the image slices are generated by dividing the image data spatially and/or temporally.

9. The system of claim 6, wherein the image reorganization unit converts the image data, as a YCbCr color space, into an RGB color space before the generating of the image slices.

10. A method of decoding image data from a bitstream, comprising:
checking an encoding type information included in the bitstream; and
separately decoding three color components of 4:4:4 chroma format based on an encoding type information, each of the three color components including a plurality of encoded image slices included in the bitstream, with independency in decoding between the three color components,
wherein each of the plurality of encoded image slices contains one of the three color components.

11. The method of claim 10, wherein the separate decoding of three color components further comprises decoding each of the plurality of encoded image slices in parallel.

12. The method of claim 10, wherein each of the plurality of encoded image slices have been generated by dividing the image data spatially.

13. The method of claim 12, wherein the separate decoding of three color components does not include a deblocking filter operation applied at a boundary between adjacent image slices.

14. The method of claim 10, wherein each of the image slices have been generated by dividing the image data temporally.

15. The method of claim 10 further comprising restoring the image data in consideration of values of corresponding pixels between the decoded image slices.

16. The method of claim 10, wherein the encoding type information indicates whether the three color components of 4:4:4 chroma format are encoded separately.

17. The method of claim 15, further comprising converting the restored image data, as an RGB color space, into a YCbCr color space.

18. At least one non-transitory medium comprising computer readable code to control at least one processing element to implement the method of claim 10.

* * * * *